United States Patent [19]

Weller et al.

[11] 4,132,497
[45] Jan. 2, 1979

[54] DRILLING MACHINES AND GUARDS THEREFOR

[76] Inventors: Stanley T. Weller, 14 Sutherland Grove, Southfields, London, SW18; Peter K. Weller, 11 Pepys Rd., Raynes Park, London, SW20; Michael A. Weller, 54 Ferrers Rd., Streatham, London, SW16, all of England

[21] Appl. No.: 817,858
[22] Filed: Jul. 21, 1977
[30] Foreign Application Priority Data

Jul. 23, 1976 [GB] United Kingdom ............... 30853/76
Mar. 15, 1977 [GB] United Kingdom ............... 10983/77

[51] Int. Cl.$^2$ ............................................. B23B 47/00
[52] U.S. Cl. ................................. 408/241 G; 408/710
[58] Field of Search ...................... 408/241 G, 710, 67, 408/72 R

[56] References Cited
U.S. PATENT DOCUMENTS
1,563,887 12/1925 Wiespetat ......................... 408/710 X FOREIGN PATENT DOCUMENTS
571794 9/1945 United Kingdom ............... 408/241 G
574285 12/1945 United Kingdom ............... 408/241 G
603351 6/1948 United Kingdom ............... 408/241 G Primary Examiner—Travis S. McGehee
Attorney, Agent, or Firm—Watson, Cole, Grindle & Watson

[57] ABSTRACT

The invention relates to a guard for protecting a drilling machine operator from a drill bit mounted in a vertical drilling machine. The guard comprises a multi-part shield which when operative at least substantially surrounds the drill bit, a tubular protecting member adapted to be attached to the quill of the drilling machine and extending downwardly beneath the quill and within the shield, and means for connecting the shield to the protecting member whereby the shield is suspended therefrom, the shield extending upwardly to a height at least equal to the lower end of the protecting member, and at least one part of the shield being movable between its operative position and an inoperative position which allows access to the drill bit. The protecting member is preferably a split ring which is clamped around the quill and the shield is preferably formed of two half-shields of transparent plastics material attached by a slide to the protecting member.

16 Claims, 10 Drawing Figures

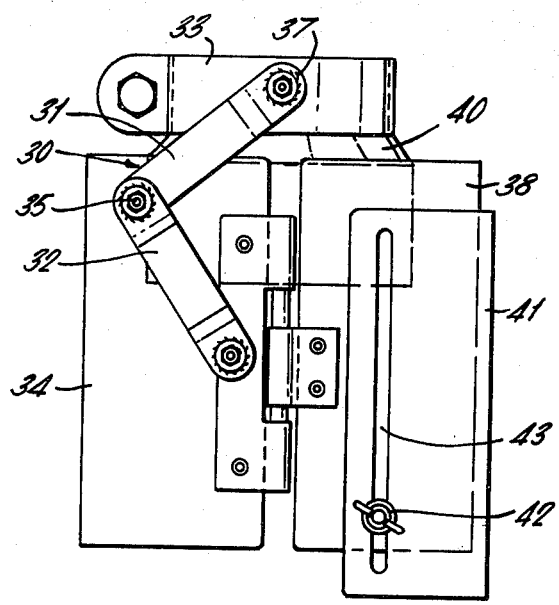
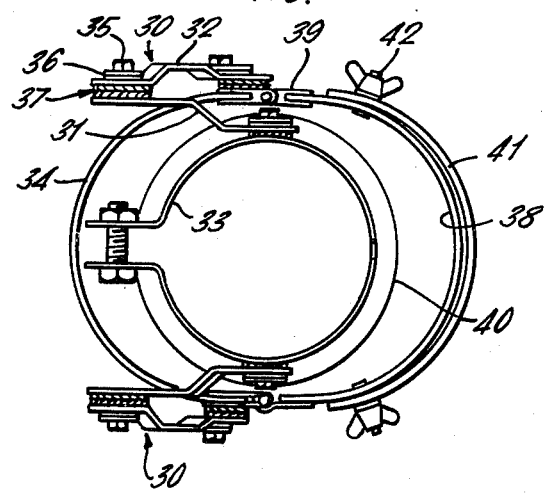

DRILLING MACHINES AND GUARDS THEREFOR

BACKGROUND OF THE INVENTION

Field of the Invention

The invention relates to drilling machines and guards therefor.

SUMMARY

According to the invention there is provided a guard for protecting a drilling machine operator from a drill bit mounted in a vertical drilling machine, the guard comprising a multi-part shield which when operative surrounds or substantially surrounds the drill bit, a tubular protecting member adapted to be attached to the quill of the drilling machine and extending downwardly beneath the quill and within the shield, and means for connecting the shield to the protecting member whereby the shield is suspended therefrom, the shield extending upwardly to a height at least equal to the lower end of the protecting member, and at least one part of the shield being movable between its operative position and an inoperative position which allows access to the drill bit.

Preferably the connection means allow vertical movement of the shield relative to the protecting member. It will be appreciated that the shield still extends upwardly to a height at least equal to the lower end of the protecting member even in the lowermost position of the shield relative to the protecting member. There is thus no horizontal gap between the shield and the protecting member.

In one embodiment of the invention the connection means is a slide which allows the shield to move freely in a vertical direction relative to the protecting member between an extreme upper position and an extreme lower position, the weight of the shield acting to bias the shield towards its lowermost position. Means may be provided for holding the shield fixed relative to the protecting member, for example in a raised position of the shield, so that the drill bit may be changed.

In another embodiment of the invention the connection means is at least one articulated linkage pivotally connected between the shield and the protecting member, the or each linkage comprising two links which at their adjacent ends are pivotally connected together and at their other ends are pivotally connected to the protecting member and the shield respectively. Preferably each pivoted connection comprises a screw connection and interengaging means on the adjacent surfaces of the members being pivotally connected together, which interengaging means resist but do not preclude relative pivotal movement of the members in either direction about the axis of the screw connection between a plurality of positive positions. Preferably the interengaging means of each pivotal connection comprises a ring of alternate projections and recesses on each said adjacent surface, the projections of one ring engaging the recesses of the other ring. It is also preferred that each pivotal connection includes a compressible washer, e.g. formed of neoprene, which allows relative axial movement of the members during relative pivotal movement of the members and combines with the screw connection to urge the members towards each other to resist undesired pivotal movement.

The protecting member preferably comprises a split ring adapted to be clamped around the quill of the drilling machine.

Preferably the multi-part shield comprises two half-shields of semicircular cross-section, the first half-shield, which, in use, is positioned on the far side of the drill bit from the operator, being attached by the connection means to the protecting member, and the second half-shield, which, in use, is positioned between the drill bit and the operator, being attached to the first half-shield.

It is also preferred that the second half-shield is hinged to the first half-shield for pivotal movement about a vertical axis into said inoperative position to allow access to the drill bit, and catch means are provided to releasably maintain the second half-shield in its closed operative position.

The second half-shield is preferably formed of a material which allows the operator to see the drill bit therethrough. For example, the material may be a transparent plastics material, or toughened or armored glass. Alternatively, the material may be a steel mesh.

The guard may include a second shield, and means for mounting the second shield in overlapping relation with the first-mentioned shield, which means permits vertical movement of the second shield relative to the first-mentioned shield.

Preferably the second shield is mounted in telescopic relation with the first-mentioned shield. The second shield may be mounted within the first-mentioned shield. Also, the second shield may be a multi-part shield, at least one part of the second shield being movable between its operative position and an inoperative position.

The invention also provides a drilling machine having a guard as described above.

BRIEF DESCRIPTION OF THE DRAWINGS

FIG. 9 shows a side elevation of a still further modified guard; and

FIG. 10 shows a plan view of the guard of FIG. 9.

DESCRIPTION OF THE PREFERRED EMBODIMENTS

Figure 1:
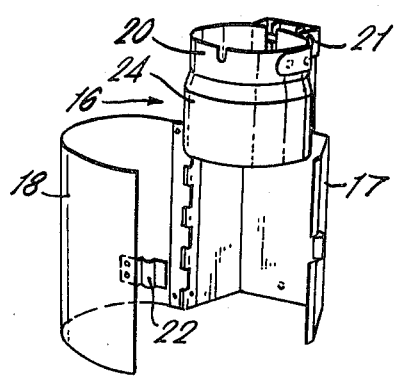
FIG. 1 is a front perspective view of a guard for a drilling machine, the shield of the guard being in its lowered position and the front part of the shield being in its open inoperative position.

Referring to FIGS. 1 to 5, there is shown part of a standard industrial vertical drilling machine 10 in which a drill bit 11 is held by a chuck 12 above a work-holding vice 13. The chuck 12 is attached to a spindle driven by an electric motor, the spindle having a quill 14 which is a non-rotatable housing which moves vertically with the drill bit as the drill bit is moved towards or away from the work to be drilled by a handle 15 manually rotatable about a horizontal axis.

For the protection of the drilling machine operator there is provided a guard 16 for the drill bit. The guard comprises a multi-part shield which, in this embodiment, comprises two half-shields 17, 18. The half-shield 17 which, in use, is located on the far side of the drill bit from the operator is formed of sheet metal and is mounted on a vertical slide 19 which connects the shield 17, 18 to a protecting member which, in this embodiment, comprises a split ring 20 which is adapted to be clamped by a screw 21 around the lower portion of the quill 14. The other or front half-shield 18, which, in use, is located between the drill bit and the operator, is formed of transparent plastics material to allow the operator to see the drill bit during drilling and is hinged to the half-shield 17 along one vertical edge. Thereby the half-shield 18 may be pivoted about a vertical axis into an open or inoperative position to allow access to the drill bit so that the drill bit may be changed. When the front half-shield 18 is in its closed or operative position, the two-half-shields surround the drill bit. A spring catch 22 is provided to releasably secure the front half-shield 18 in its operative position.

Figure 2:
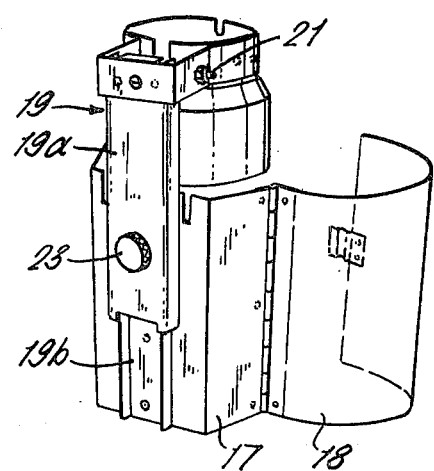
FIG. 2 is a rear perspective view of the guard of FIG. 1, the shield being in the same state.
Figure 3:
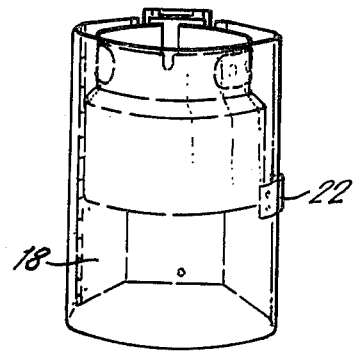
FIG. 3 is a front perspective view of the guard of FIG. 1, the shield of the guard being in its raised position and the front part of the guard being in its closed operative position.
Figure 4:
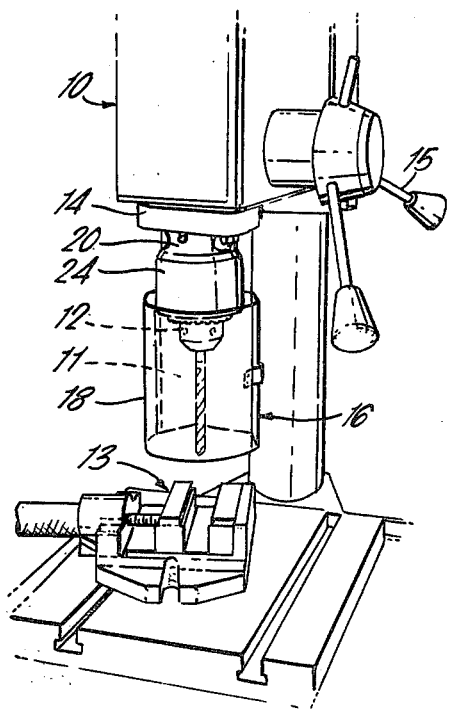
FIG. 4 shows the guard of FIG. 1 mounted on a drilling machine before a drilling operation commences.
Figure 5:
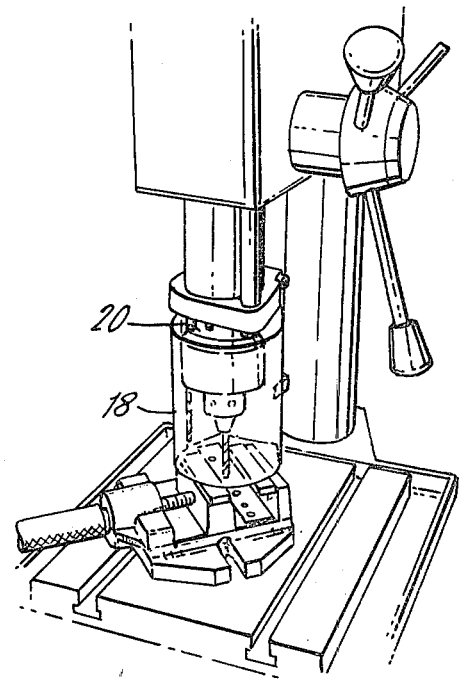
FIG. 5 shows the guard of FIG. 1 mounted on a drilling machine during the course of a drilling operation.

The slide 19 includes a ball bearing runner which permits the shield to rise and fall freely between an extreme upper position shown in FIG. 3, an intermediate position shown in FIG. 5 and an extreme lower position shown in FIGS. 1, 2 and 4. A clamping screw 23 is provided to allow the outer channel 19a of the slide to be locked relatively to the inner channel 19b and thereby hold the shield at a fixed height relative to the suspension split ring 20, for example in its uppermost position during changing of the drill bit 11.

The suspension split ring 20 extends downwardly beneath the quill 14 of the drilling machine and within the half-shields 17, 18, the downwardly extending portion, in this embodiment, forming a skirt 24 having a larger diameter than the upper portion adjacent the quill. However, in other embodiments, if the chuck 12 permits, the downwardly extending portion may have the same diameter as the upper portion or even a smaller diameter than the upper portion. In each case it is essential that the half-shields 17, 18 extend upwardly to a height which is at least equal to, and in this embodiment, in overlapping relation with the split ring in all positions of the half-shields. Thereby, there is no horizontal gap between the top of the half-shields 17, 18 and the lower end of the split ring.

During a drilling operation, the shield 17, 18 commences in its lowermost position. The drill bit 11 is then lowered until the lower end of the shield engages the work piece or, as shown in FIG. 5, the work-holding vice 13. The shield then remains stationary during the remainder of the downward movement of the drill bit and during the corresponding upward movement of the drill bit. The operator is thus fully protected from the drill bit during the entire drilling operation.

To allow the drill bit 11 to be changed, the front half-shield 18 is opened and, if desired, the shield is clamped in its raised position by the clamping screw 23.

Figure 6:
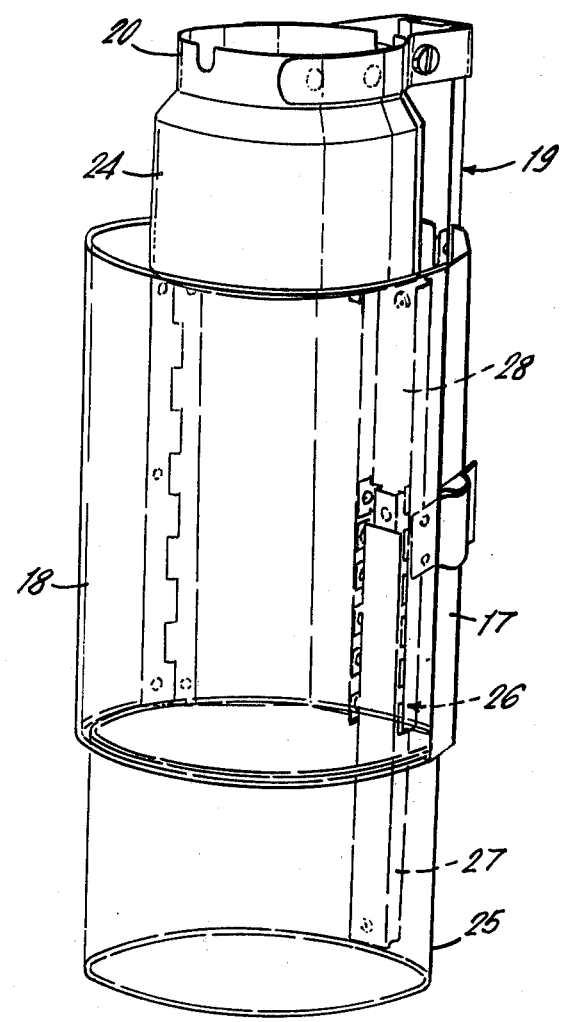
FIG. 6 is a perspective view of a modified guard.

FIG. 6 shows a modified guard which includes a lower shield 25 which is mounted on a ball bearing slide 26 for sliding telescopic movement relative to the upper half-shields 17, 18. In this embodiment the lower shield is a tube formed of transparent plastics material screwed to the inner sliding member 27 of the slide whilst the outer sliding member 28 is spot welded to the inner surface of the half-shield 18. Once again the shield 25 and the half-shields 17, 18 are maintained in overlapping relation so that in all positions of the shields there is no horizontal gap between the shields.

If desired the lower shield 25 may comprise two half-shields in like manner to the upper shield 17, 18, the rear half-shield being screwed to the inner sliding member 27 and the front half-shield being vertically hinged to the rear half-shield for pivotal movement into an inoperative position and held in its operative position by a spring catch.

Also, the lower shield, whether it is formed by a tube or two half-shields, may be mounted on a slide so that it is external rather than internal of the upper shield. In this case, the slide for the lower shield is mounted back to back with the slide 19 for the upper shield or is mounted directly on the external surface of the rear half-shield 17 of the upper shield in parallel relation with the slide 19.

Figure 7:
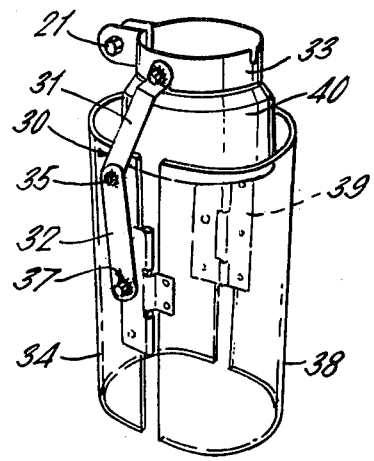
FIG. 7 shows a further modified guard with the front part of the shield in its closed operative position.
Figure 8:
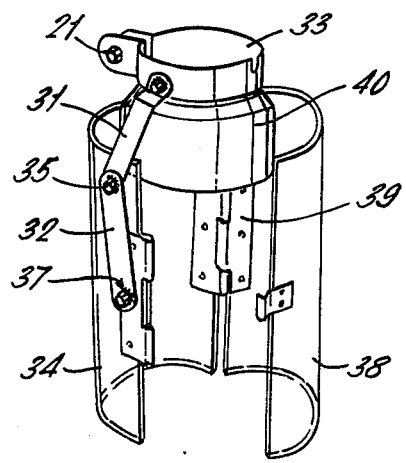
FIG. 8 shows the guard of FIG. 7 with the front part of the shield in its open inoperative position.

FIGS. 7 and 8 show a further modified guard of which the basic difference from the guards described above is that the slide connection means between the suspension split ring 33 and its integral skirt 40 and the multi-part shield 34, 38 is replaced by a pair of articulated linkages 30 which allow the shield to be lowered and raised relatively to the drill bit to accommodate drill bits of different length, but resist such relative movement during a drilling operation.

Each articulated linkage 30 comprises two links 31, 32 pivotally connected together at their adjacent ends and which at their other ends are pivotally connected to the suspension split ring 33 and the rear half-shield 34 respectively. Each pivotal connection comprises a screw and nut connection 35 including a neoprene washer 36 (shown in FIG. 10) and interengaging means on at least the adjacent surfaces of the two members of the guard being connected, i.e., the link 31 and ring 33 or the link 32, and the rear half-shield 34, and the links 31, 32 of the respective linkage.

In this embodiment, the interengaging means of each pivotal connection comprise two similar rings 37 of alternate projections and recesses which are pressed into the adjacent surfaces, the projections of the ring on one surface engaging the recesses of the ring on the other surface. As shown in the drawings, for practical reasons, it is convenient in this embodiment to provide both surfaces at each end of each link 31, 32 with these rings 37 of alternate projections and recesses. The provision of the neoprene washer 36 serves both to urge the respective rings 37 into interengagement of the projections and recesses and also to allow the relative rotation of the rings and hence the members of the guard being connected, about the axis of the respective screw connection 35. The interengaging rings 37 and the washer 36 thereby serve to resist but not preclude relative rotation of the respective members in either direction which is allowed to occur in positive and predetermined steps.

As before, in the lowermost position of the half-shields 34, 38, the half-shields remain in overlapping relation with the lower end of the skirt 40. The front half-shield 38 is also vertically hinged to the rear half-shield 34 for pivotal movement into an inoperative position and is held in its operative position by a spring catch 39. Furthermore, in this embodiment, both half-shields are formed of transparent plastics material.

FIGS. 9 and 10 show a guard which is of the same basic construction as the guard of FIGS. 7 and 8, but which includes an additional front half-shield 41. The additional shield 41 is attached to the upper front half-shield 38 by screw and nut connections 42 which pass through holes in the half-shield 38 and vertical slots 43 in the extension shield 41. The extension shield 41 may thereby be raised and lowered relative to the half-shield 38.

If desired, the rear half-shield 34 may also be provided with an extension shield 41. The provision of the extension shield or shields 41 allows the guard to accommodate even longer drill bits.

Also, in any of the embodiments shown in FIGS. 7 to 10, the front and rear half-shields 38, 34 may be separately suspended from the split ring 33 by respective articulated linkages 30.

The invention is not restricted to the specific details of the embodiments described above. For example, the main shield and/or extension shield may be formed of toughened or armoured glass, or of a screen mesh having a size of mesh which permits the operator to see the drill bit during drilling but precludes swarf from passing through the mesh.

Also, the spring catch for holding the front half-shield in its operative position may be replaced by a magnetic catch.

Furthermore, the main shield, the extension shield, if provided, and the split ring or other protecting member may be formed of a cross-section other than circular, for example, of square cross-section.

The slide of the embodiment of FIGS. 1 to 5, or one or both of the slides of the embodiment of FIG. 6, may include a runner having rollers instead of ball bearings, or the runner may be omitted and the slide merely comprise two channel members, one channel sliding inside the other.

Also the drilling machine may be of the kind in which the drill bit is not held in a chuck bit has a tapered socket for retention of the drill bit. In this case, the split ring or other protecting member extends downwardly beneath the quill and protects the operator from at least the upper part of the holding means for the drill bit.

Further, although each embodiment of guard has been described as being suitable for fixture to a drilling machine for protecting the operator from a drill bit, the guard may be used on a drilling machine for protecting the operator from a tap or broach or may be used on a machine which is solely a tapping or broaching machine.

One advantage of each embodiment described above in that there is no horizontal gap between the upper end of the main shield and the bottom end of the suspension split ring or other protecting member, irrespective of the vertical position of the shield relative to the protecting member.

Another advantage of each embodiment is that the protecting member, for example the skirt or lower portion of the split ring, provides protection to the operator from at least the upper portion of the chuck or other holding means for the drill bit whether the front half-shield is in its closed operative position or in its open inoperative position. At the same time, the protecting member does not preclude access to the ring gear on the chuck or the morse taper slot of other holding means, for changing the drill bit. To this end, appropriate slots may be provided in the protecting member if it extends downwardly to a level below the ring gear or morse taper slot.

We claim:

1. A guard for protecting an operator from the rotating parts of machines and suspended from a non-rotating support member adapted to be moved relatively toward and from a workpiece, comprising:

a protecting member adapted to be attached to said non-rotating support member and extending therefrom;

a multi-part shield overlapping at least a portion of said protecting member and including a shield portion movable to enable access to said rotating parts in an inoperative condition;

a slide member mounted between, and on the outer peripheries of, said protecting member and said multi-part shield, and extending along an axis substantially parallel to the axis of movement of said non-rotating support member, at least one part of said shield being movable along said slide member; and said shield having a larger outer peripheral dimension than the outer peripheral dimension of said protecting member, and said at least one part of said shield being movable to enable access to said rotating parts by manual operation of said shield portion with the non-rotating support member retracted from the workpiece, and said shield being movable to engage the workpiece and substantially enclose said rotating parts with said non-rotating member extended toward said workpiece.

2. A guard as claimed in claim 1, wherein said shield portion moves freely between an extreme retracted position and an extreme extended position, the weight of the shield acting to bias the shield towards said extended position.

3. A guard as claimed in claim 1, including means for holding said multi-part shield fixed relative to the protecting member.

4. A guard as claimed in claim 1, wherein the protecting member is a split ring adapted to be clamped around said non-rotating support member.

5. A guard as claimed in claim 1, wherein the multi-part shield comprises two half-shields, the first half-shield is positioned opposite said rotating machine parts from the operator, and said first half-shield being attached by said slide member to the protecting member, and the second half-shield is positioned between said rotating machine parts and the operator, and being attached to said first half-shield.

6. A guard as claimed in claim 5, wherein said second half-shield is hinged to said first half-shield to allow access to the interior of said multi-part shield, and further comprising catch means to releasably maintain the second half-shield closed on said first half-shield.

7. A guard as claimed in claim 5, wherein at least the second half-shield is formed of a material which allows the operator to see the drill bit therethrough.

8. A guard as claimed in claim 7, wherein said material is a transparent plastics material.

9. A guard as claimed in claim 1, wherein said at least one part of said shield is a second shield engaging said slide member to be in overlapping relation with said shield portion thereby enabling movement of said second shield relative to said shield portion.

10. A guard as claimed in claim 9, wherein said second shield is mounted in telescopic relation with said shield portion.

11. A guard as claimed in claim 10, wherein said second shield is mounted within said shield portion.

12. A guard as claimed in claim 10, wherein said second shield is a multi-part shield, at least one part of said second shield being hinged to the other part thereof to enable access to the interior of said second shield, and further comprising a catch means to releasably retain said at least one part of said second shield closed on said other part of said second shield.

13. A guard for protecting a drilling machine operator from a drill bit mounted in a vertical drilling machine, the guard comprising a multi-part shield which when operative at least substantially surrounds the drill bit, a tubular protecting member adapted to be attached to the quill of the drilling machine and extending downwardly beneath the quill and within the shield, and means for connecting the shield to the protecting member whereby the shield is suspended therefrom, the shield extending upwardly to a height at least equal to the lower end of the protecting member, and at least one part of the shield being movable between its operative position and an inoperative position which allows access to the drill bit, the connection means allowing vertical movement of the shield relative to the protecting member and including at least one articulated linkage pivotally connected between the shield and the protecting member, the linkage including two links which at their adjacent ends are pivotally connected together and at their other ends are pivotally connected to the protecting member and the shield respectively.

14. A guard as claimed in claim 13, wherein each pivotal connection comprises a screw connection and interengaging means on the adjacent surfaces of the members being pivotally connected together, which interengaging means resist but do not preclude relative pivotal movement of the members in either direction about the axis of the screw connection between a plurality of positive positions.

15. A guard as claimed in claim 14, wherein said interengaging means of each pivotal connection comprises a ring of alternate projections and recesses on each said adjacent surface, the projections of one ring engaging the recesses of the other ring.

16. A guard as claimed in claim 14, wherein each pivotal connection includes a compressible washer which allows relative axial movement of the members during relative pivotal movement of the members and combines with the screw connection to urge the members towards each other to resist undesired pivotal movement.

* * * * *